United States Patent
Senda et al.

(10) Patent No.: US 7,324,869 B2
(45) Date of Patent: Jan. 29, 2008

(54) TOOL INFORMATION DISPLAY DEVICE FOR PROCESSING MACHINE

(75) Inventors: Takashi Senda, Inuyama (JP); Makoto Totsugi, Inuyama (JP)

(73) Assignee: Murata Kikai Kabushiki Kaisha, Kyoto-shi (JP)

(*) Notice: Subject to any disclaimer, the term of this patent is extended or adjusted under 35 U.S.C. 154(b) by 0 days.

(21) Appl. No.: 11/546,949

(22) Filed: Oct. 13, 2006

(65) Prior Publication Data

US 2007/0124016 A1   May 31, 2007

(30) Foreign Application Priority Data

Nov. 25, 2005   (JP) .............................. 2005-340461

(51) Int. Cl.
  *G06F 15/46*   (2006.01)
  *G06F 19/00*   (2006.01)
  *G05B 19/417*   (2006.01)

(52) U.S. Cl. ...................... 700/180; 700/179; 700/192

(58) Field of Classification Search ................ 700/179, 700/180, 192

See application file for complete search history.

(56) References Cited

U.S. PATENT DOCUMENTS

| | | | |
|---|---|---|---|
| 4,591,989 A * | 5/1986 | Tanaka | 700/176 |
| 5,189,624 A * | 2/1993 | Barlow et al. | 700/169 |
| 5,844,805 A * | 12/1998 | Uchimura et al. | 700/180 |
| 6,314,336 B1 * | 11/2001 | Sugiyama et al. | 700/174 |
| 6,454,684 B2 * | 9/2002 | Kato | 483/41 |
| 6,498,962 B2 * | 12/2002 | Sugiyama et al. | 700/179 |
| 2003/0156401 A1 * | 8/2003 | Komine et al. | 361/815 |
| 2003/0215312 A1 * | 11/2003 | Yanaka et al. | 414/222.01 |

FOREIGN PATENT DOCUMENTS

JP   2003-181568 A   7/2003

* cited by examiner

*Primary Examiner*—Michael D. Masinick
(74) *Attorney, Agent, or Firm*—Westerman, Hattori, Daniels & Adrian, LLP.

(57) ABSTRACT

The present invention provides a tool information display device for a processing machine which can display information on tools installed in appropriate parts of the processing machine, in an easy-to-understand manner. The present invention allows even the identification numbers of installed tools to be checked in an easy-to-understand manner. The present invention provides a tool information display device for a processing machine 101 having tool magazines 5, 6 on each of which a plurality of tools can be installed. The tool information display device includes tool information managing means 33 for managing information on the tools 7 installed on the tool magazines 5, 6. The tool information display device also includes installation status display means 33 for providing a display 50 of installation status of the tools which reproduces installation and arrangement of the tools on the tool magazine 5, 6 in a pseudo manner, in accordance with the information managed by the tool information managing means 33. In the pseudo installation status display 50 for the tools, tool presence information 51 is displayed at positions on the tool magazines 5, 6 at which tools 7 are installed and not at positions on the tool magazines 5, 6 at which no tools 7 are installed. The identification number of each of the tools 7 is displayed in addition to the tool presence information 51.

4 Claims, 5 Drawing Sheets

FIGURE 2A
FIGURE 2B
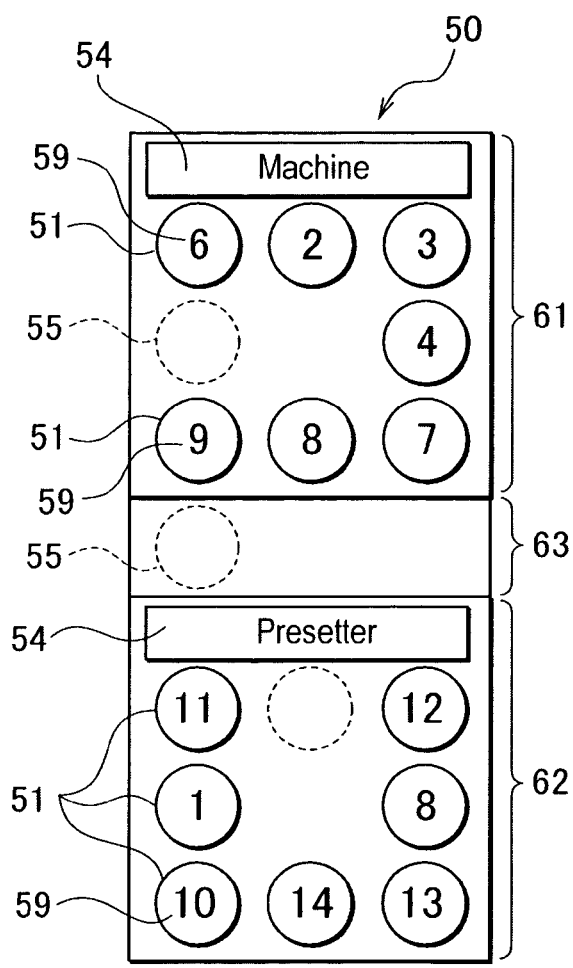
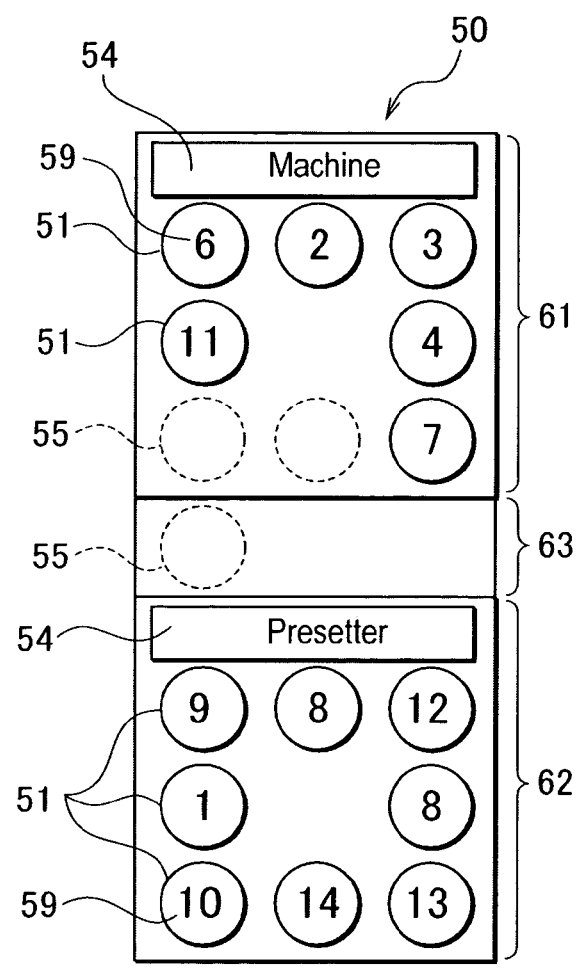

TOOL INFORMATION DISPLAY DEVICE FOR PROCESSING MACHINE

FIELD OF THE INVENTION

The present invention relates to a tool information display device for a processing machine which displays information on tools installed on a processing machine such as a punch press.

BACKGROUND OF THE INVENTION

With a processing machine having tool magazines on each of which a plurality of tools can be installed, for example, a punch press that uses a turret as a tool magazine, it may be necessary to confirm the numbers of tools placed in the respective pockets on the tool magazine in which the tools are installed. To check the number of the tool placed in each pocket on the tool magazine, an operator conventionally visually checks the tool magazine. Alternatively, the operator checks a list showing the correspondences between the numbers of the pockets on the tool magazine and the numbers of the tools in the pockets.

However, much time and effort are required for the operator to visually check the tool magazine, and it is also difficult to remember a plurality of tools when they are to be changed. Further, the list showing the correspondences between the numbers of the pockets on the tool magazine and the tool numbers is difficult to understand and may cause the operator to erroneously recognize the display information.

An object of the present invention is to provide a tool information display device for a processing machine which can display information on tools installed in appropriate parts of the processing machine, in an easy-to-understand manner. Another object of the present invention is to omit excess display items to provide an easy-to-understand display. Yet another object of the present invention is to allow even the identification numbers of installed tools to be checked in an easy-to-understand manner.

SUMMARY OF THE INVENTION

The configuration of the present invention will be described with reference to FIG. 1 corresponding to an embodiment. The tool information display device for a processing machine 101 has tool magazines 5, 6 on each of which a plurality of tools 7 can be installed, and comprises tool information managing means 31 for managing information on the tools 7 installed on the tool magazines 5, 6 and installation status display means 33 for providing a display of installation status 50 of the tools which reproduces installation and arrangement of the tools 7 on the tool magazines 5, 6 in a pseudo manner, in accordance with the information managed by the tool information managing means 31.

With this configuration, the installation status display means 33 displays the installation status 50 of the tools which reproduces the installation and arrangement of the tools on the tool magazines 5, 6 in a pseudo manner. Since the installation and arrangement of the tools are reproduced in a pseudo manner, information on the tools 7 installed in the processing machine 101 is easily understood at a glance.

According to the present invention, the installation status display means 33 may display, in the pseudo installation status display 50 for the tools 7, tool presence information 51 at positions on the tool magazines 5, 6 at which tools 7 are installed and not at positions on the tool magazines 5, 6 at which no tools 7 are installed. This configuration does not display the tool presence information 51 at the positions where no tools 7 are installed. Accordingly, the display includes no excess items and is easier to understand.

According to the present invention, the installation status display means 33 may display identification numbers of the tools 7 in addition to the tool presence information 51. In this case, the installation status display means 33 may have only to display, in the pseudo installation status display 50 for the tools 7, tool presence information 51 at positions on the tool magazines 5, 6 at which tools 7 are installed, and may display tool absence information at positions at which no tools 7 are installed. Displaying both the tool presence information 51 and the identification numbers of the tools 7 allows even the identification numbers of the installed tools 7 to be checked in an easy-to-understand manner.

The tool information display device for a processing machine according to the present invention has the tool magazines on each of which the plurality of tools can be installed and comprises the tool information managing means for managing information on the tools installed on the tool magazines and the installation status display means for providing the display of installation status of the tools which reproduces the installation and arrangement of the tools on the tool magazines in a pseudo manner, in accordance with the information managed by the tool information managing means. This allows information on the tools installed in the appropriate parts of the processing machine to be displayed in an easy-to-understand manner. The installation status display means may display, in the pseudo installation status display for the tools, the tool presence information at the positions on the tool magazines at which tools are installed and not at the positions on the tool magazines at which no tools are installed. Then, the display includes no excess items and is easier to understand. Where the installation status display means displays, in the pseudo installation status display for the tools, the tool presence information at the positions on the tool magazines at which tools is installed, the installation status display means may display the identification numbers of the tools in addition to the tool presence information. This allows even the identification numbers of the installed tools to be checked in an easy-to-understand manner.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 2A and 2B illustrate an example of change of a screen of the tool information display device.

DETAILED DESCRIPTION OF THE PREFERRED EMBODIMENTS

Figure 1:
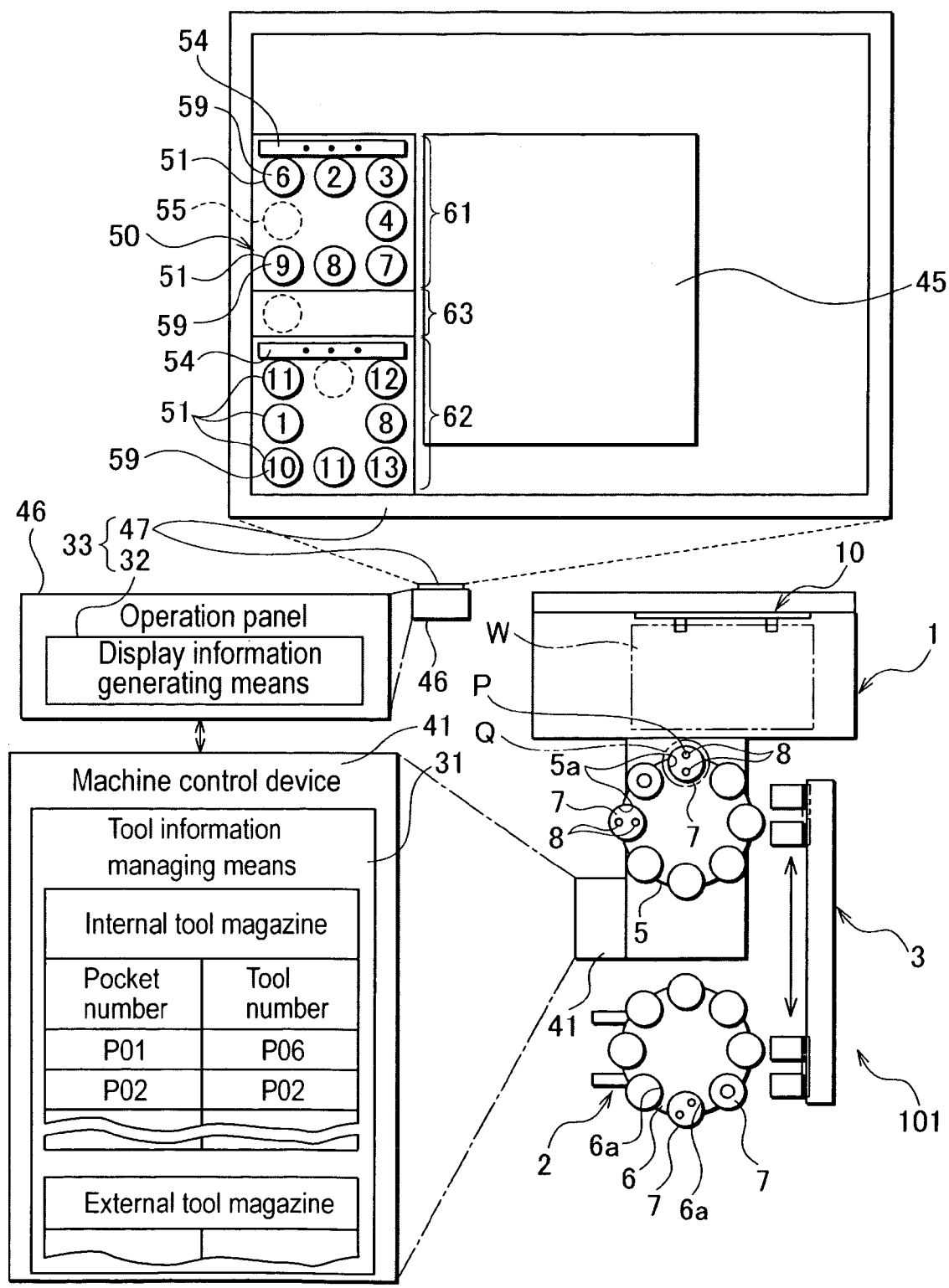
FIG. 1 is a block diagram showing the conceptual configuration of a tool information display device for a processing machine according to a first embodiment of the present invention.

A first embodiment of the present invention will be described with reference to FIGS. 1 to 5. FIG. 1 shows the conceptual configuration of a processing facility comprising a tool information display device according to the first embodiment. The processing facility comprises a processing machine 101, a machine control device 41 that controls the processing machine 101, and an operation panel 46 that allows the operation for the machine control device 41 and the direct operation for the processing machine 101. The tool information display device displays tool installation information on a screen of a screen display device 47 of the operation panel 46.

Figure 3:
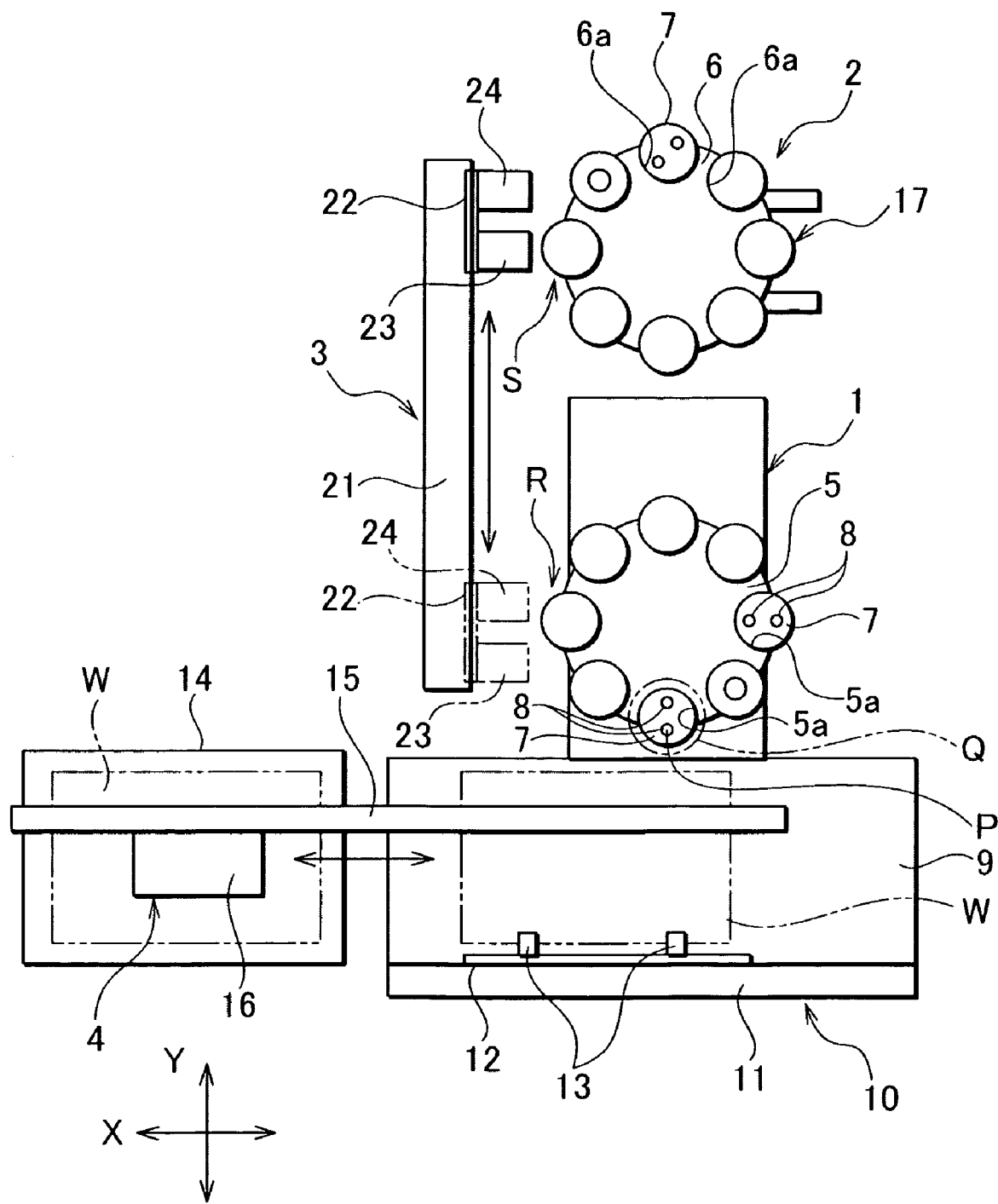
FIG. 3 is a plan view showing an example of a processing machine to which the tool information display device is applied.

The present embodiment is applied to the processing machine 101 mainly composed of a punch press I configured as described below. As shown in FIG. 3, the processing machine 101 comprises the punch press 1, a presetter 2, a tool changer 3, and a loader 4. The punch press I comprises an internal tool magazine 5 on which a plurality of turret type tools 7 are changeably installed; individual tools 8 are mounted on the respective turret type tools 7. The tool changer 3 is a device that automatically changes the turret type tools 7 between the internal tool magazine 5, provided in the punch press 1, and an external tool magazine 6 provided in the presetter 2.

Figure 5:
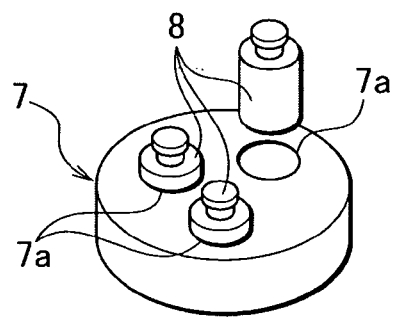
FIG. 5 is a perspective view showing a turret type tool.

As shown in FIG. 5, the turret type tool 7 is a turret with a circular planar shape on which one or more individual tools 8 are mounted. The individual tool 8 is changeably mounted in an individual tool supporting portion 7a formed in the turret type tool 7 and comprising a through-hole or the like. The individual tool 8 is either a punch tool or a die tool. The punch and die tools are used in a vertical pair. Some of the turret type tools 7 are used for the punch tools, while the others are used for the die tools, and the turret type tools 7 are formed into vertical pairs. In the figure, only the turret type tool 7 for the punch tool is shown, with the turret type tool 7 for the die tool omitted.

Figure 4:
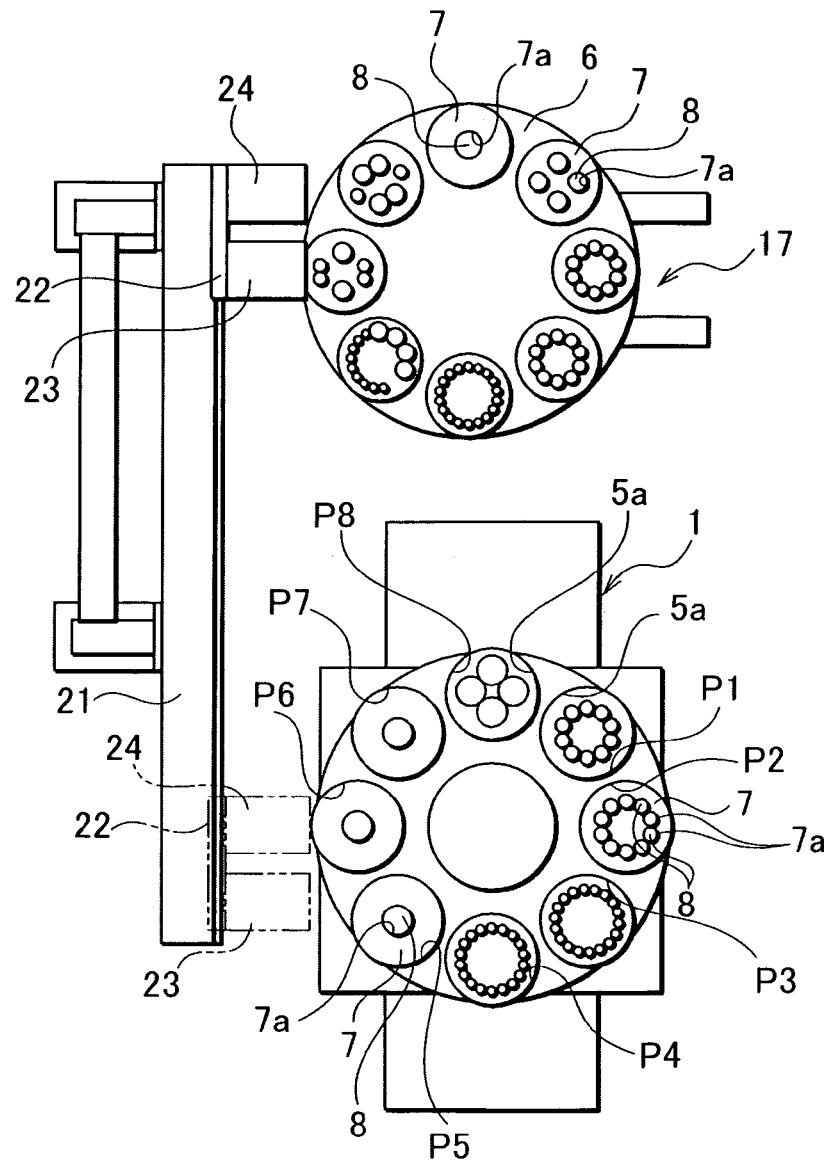
FIG. 4 is an enlarged plan view showing an internal tool magazine, an external tool magazine, and a tool changer.

The individual tools 8 have different hole shapes and sizes for punching. The plurality of individual tool supporting portions 7a provided in the turret type tools 7 are adapted for processing for different hole shapes and sizes. Further, as shown in FIG. 4, the turret type tools 7 are prepared different numbers, positions, sizes and the like for the individual tool supporting portions 7a. Plural types of individual tools 8 with an equal outer diameter dimension can be mounted in the same individual tool supporting portions 7a. Arbitrary applicable individual tools 8 are mounted in the individual tool supporting portions 7a of these types of turret type tools 7 for individual tool organization of the turret type tools 7.

The internal tool magazine 5 can be rotated in a horizontal direction, and the internal tool magazine 5 has pockets 5a formed in its outer peripheral portion at a plurality of positions in its circumferential direction to releasably hold the turret type tools 7. The pockets 5a are identified by pocket numbers POI to P08 for control. A vertical pair of the internal tool magazines 5 is provided, and the internal tool magazines 5 hold the punch-side turret type tool 7 and the die-side turret type tool 7, respectively and rotate in synchronism with each other. The figure shows only the upper-side internal tool magazine 5.

In FIG. 3, the punch press 1 has a magazine indexing portion and a tool holder indexing portion (neither of them is shown in the drawings) as a tool indexing mechanism. The magazine indexing portion rotates the internal tool magazine 5 so that an arbitrary pocket 5a on the internal tool magazine 5 is located at a predetermined press head position Q. The tool holder indexing portion holds the turret type tool 7 located at the press head position Q and rotates it around the center of the tool holder to index an arbitrary individual tool in the turret type tool 7 to a predetermined punch position P. The individual tool 8 indexed to the punch position P is subjected an elevating or lowering operation for punching provided by a punch driving source such as a servo motor via a ram that can be elevated and lowered.

The punch press 1 has a plate material feeding mechanism 10 that moves a plate material W on a table 9 along two orthogonal axes (X and Y axes). The plate material feeding mechanism 10 moves to shift a position on the plate material W to be processed to a punch position P. The plate material feeding mechanism 10 has a carriage 11 that moves forward and backward along the Y axis, and on which a cross slide 12 is mounted so as to be movable forward and backward along the X axis. A plurality of work holders 13 are attached to the cross slide 12 to grip an end of the plate material W.

The loader 4 is a device which grips, by suction or the like, each of the plate materials W stacked on a predetermined plate material placing portion 14 and which feeds the plate material W onto the table 9 of the punch press 1. The loader 4 has a traveling member 16 which travels on a rail 15 and which comprises suction pads (not shown in the drawings) that grip the plate material W.

The presetter 2 is installed so that it can rotate and index the external tool magazine 6 to an appropriate position, and the presetter 2 is arranged behind the punch press 1. The presetter 2 is provided with a setup change portion 17 that allows an operator to change any of the turret type tools 7 on the external tool magazine 6. Like the internal tool magazine 5, the external tool magazine 6 can be rotated in the horizontal direction, and the external tool magazine 6 has pockets 6a formed in its outer peripheral portion at a plurality of positions in its circumferential direction to releasably hold the turret type tools 7. A vertical pair of the external tool magazines 6 is also provided, and the external tool magazines 6 are concentrically installed in the vertical direction, and used for the turret type tools 7 in which punch tools are mounted and for the turret type tools 7 in which die tools are mounted, respectively. Magazine indexing means (not shown in the drawings) carries out driving for rotational indexation.

The tool changer 3 is a device that changes the turret type tools 7 between the internal tool magazine 5 in the punch press 1 and the external tool magazine 6, and the tool changer 3 changes the turret type tools 7 at change indexing portions R, S. The tool changer 3 comprises a guide rail 21 that extends between the change indexing portion R on the internal tool magazine 5 and the change indexing portion S on the external tool magazine 6, respectively, and a traveling member 22 that travels along the guide rail 21. The traveling member 22 has two chucks 23, 24 provided in parallel in a traveling direction to hold the respective turret type tools 7. Any one of the chucks 23, 24 holds a turret type tool 7 to be changed, while the other of the chucks 23, 24, which is empty, receives a turret type tool 7 from the internal tool magazine 5 or external tool magazine 6, and the turret type tool 7 to be changed held by the chuck 23 or 24 is then delivered to the internal tool magazine 5 or external tool magazine 6. This enables the turret type tool 7 to be changed by a single traveling operation of the traveling member 22 between the internal tool magazine 5 and the external tool magazine 6.

The traveling member 22 also enables the turret type tools 7 to be changed by a single traveling operation even when it has only one chuck 23 or 24 and when the turret type tool 7 to be changed is temporarily placed on temporary placement stands (not shown in the drawings) provided near the change indexing positions R, S. As is the case with the internal tool magazine 5 and external tool magazine 6, the chucks 23, 24, provided on the traveling member 22, are arranged in the vertical direction, and used for the turret type tools 7 in which punch tools are mounted and for the turret type tools 7 in which die tools are mounted, respectively.

A control system and information display will be described. In FIG. 1, a machine control device 41 controls the processing machine 101 in accordance with a program. The machine control device 41 is composed of a numerical control device that controls the punch press 1 of the processing machine 101, a changer control device that controls the tool changer 3, a loader control device that controls the loader 4, a scheduler, and so on (none of these components are shown in the drawings). The machine control device 41 is provided with tool information managing means 31.

The tool information managing means 31 manages information on the turret type tools 7 installed on the internal tool magazine 5 and external tool magazine 6. Specifically, for each of the pocket numbers (P01, P02, . . . ) that identify the pockets 5a, 6a on the internal tool magazine 5 and external tool magazine 6, the tool information managing means 31 stores information on the tool number (T01, T02, . . . ) of the turret type tool 7 installed in the pockets 5a, 6a identified by that pocket number. The pocket numbers (P01, P02, . . . ) are provided for each of the internal tool magazine 5 and the external tool magazine 6. The tool information managing means 31 also stores tool number information on the turret type tool 7 held on the tool changer 3.

When any one of the turret type tools 7 installed on the internal tool magazine 5 and the external tool magazine 6 has its position changed or insertion or removal of a turret type tool 7 is carried out, the tool information managing means 31 changes the stored contents automatically or in accordance with the operator's operation. Although not shown in the drawings, more specifically, the tool information managing means 31 stores, updates, and manages information on the individual tools 8 held in the turret type tools 7.

The operation panel 46 has a screen display device 47 that displays images on a liquid crystal screen or the like. The screen display device 47 is a touch panel, and the operation panel 46 switches screen display contents among various operation and display screens for display. The operator can input an operation by touching the screen with his or her finger.

The operation panel 46 comprises installation status display means 33 for displaying the installation status of the tools which reproduces the installation and arrangement of the tools on each of the internal tool magazine 5 and external tool magazine 6 in a pseudo manner, in accordance with information managed by the tool information managing means 31 of the machine control device 41. The installation status display means 33 is composed of a screen display device 47 and display information generating means 32. The display information generating means 32 generates and outputs information to be displayed on the screen display device 47, in accordance with the management information from the tool information managing means 31.

The installation status display means 33 provides a pseudo installation status display 50 for the turret type tools 7 on the screen of the screen display device 47, that is, displays the tool presence information 51 as an arrangement of circular marks which corresponds to the arrangement of the pockets on the internal tool magazine 5 and external tool magazine 6 in a pseudo manner. The pseudo installation status display 50 has display areas 61, 62 for the respective internal tool magazine 5 and external tool magazine 6, and a display area 63 for the tool changer 3, and shows the tool presence information 51 for each of the display areas 61 to 63.

In the pseudo installation status display 50, a pocket correspondence display position at which the tool presence information 51 is displayed is defined for each of the pockets 5a, 6a in the internal tool magazine 5 and external tool magazine 6. The pocket correspondence display positions are arranged so as to correspond to the arrangement of the pockets 5a, 6a on the internal tool magazine 5 and external tool magazine 6 in a pseudo manner. The term "pseud" as used in the specification refers to the arrangement of the tool presence information 51 enabling the arrangement of the pockets 5a, 6a on the internal tool magazine 5 and external tool magazine 6 to be visually intuitively determined. The arrangement of the tool presence information 51 has only to allow the viewer to determine the arrangement order and that the arrangement is cyclic. In this case, although the pockets 5a, 6a on the internal tool magazine 5 and external tool magazine 6 are circularly arranged, they are squarely arranged in the pseudo installation status display 50.

In the pseudo installation status display 50, the tool presence information 51 is displayed at the pocket correspondence display positions where the turret type tools 7 on the internal tool magazine 5 and external tool magazine 6 are installed, and in contrast, the tool presence information 51 is not displayed at the positions where no turret type tools 7 are installed. The same background as that of the surroundings may be displayed at the pocket correspondence display positions where no turret type tools 7 are installed, and a position display 55 indicative of the pocket correspondence display position may be provided at each of the pocket correspondence display positions where no turret type tools 7 are installed. In the present embodiment, the position display 55 indicative of the pocket correspondence display position is a circular range which is shown by a broken line in the figure and which is unnoticeably colored with a color similar to that of the background color.

The tool presence information 51 is a circular mark as described above. Inside the mark, an identification number display 59 for the turret type tool 7 is provided. In the tool information managing means 31, the identification number 51 is a string such as "T01", in which an initial letter "T" indicates that the string is a tool number. However, in the identification number display 59, provided in the tool presence information 51, the initial letter "T" and a high-order "0" are omitted to simply show "1" or the like. This is because the identification number display 59 in the tool presence information 51 obviously shows a tool number and because it is easier to see when it is free from extra display items such as the initial letter.

The identification number display 59 need not necessarily be placed inside the tool presence information 51. The identification number display 59 may be placed in the vicinity of the tool presence information 51 so as to visually intuitively determine the relationship between the tool presence information 51 and the identification number display 59.

The pseudo installation status display 50 is displayed in a part of screen of the screen display device 47, and a display section 45 displaying various other pieces of information is provided in the remaining part of the screen. For example, when the user touches, with his or her finger, the part of the pseudo installation status display 50 in which the tool presence information 51 is displayed, detailed information on the turret type tool 7 corresponding to this tool presence information 51 is displayed on the display section 45. A magazine distinction display 54 is provided, in string form and so on, in each of the display areas 51, 52 for the respective internal tool magazine 5 and external tool magazine 6 in the pseudo installation status display 50 to show in what part of the processing machine 101 that internal tool magazine 5 or external tool magazine 6 is located, that is, either the internal tool magazine 5 or external tool magazine 6. In this string, for example, the internal tool magazine 5 in the punch press 1 is displayed as a "machine". The external tool magazine 6 is displayed as a "presetter".

The tool information display device configured as described above shows, in the pseudo installation status display 50, the installation status of the turret type tools 7 which reproduces the tool installation and arrangement on the internal tool magazine 5 and external tool magazine 6 in a pseudo manner, and this allows information on the turret type tools 7 installed in the processing machine 101 to be understood very easily, that is, at a glance. Further, in the pseudo installation status display 50, the tool presence information 51 is displayed at positions where the turret type tools 7 are installed, and in contrast, the tool presence information 51 is not displayed at positions where no turret type tools 7 are installed. This eliminates extra display items and provides easy-to-understand displays. Each piece of tool presence information 51 is provided with the identification number display 59 for the turret type tool 7. This enables even the identification number of the turret type tool 7 installed to be checked in an easy-to-understand manner.

Moreover, in the pseudo installation status display 50, a change in the arrangement and so on of the turret type tools 7 installed in the processing machine 101 correspondingly turns on or off the display of the tool presence information 51 and changes the contents of the identification number display 59 as shown in FIGS. 2A and 2B. This allows the current arrangement status of turret type tools 7 to be immediately determined.

Thus, the information on the turret type tools 7 installed in the appropriate parts of the processing machine 101 can be understood at a glance in association with the installation positions of the turret type tools 7, and the identification numbers of the installed turret type tools 7 can also be determined. Consequently, even if the screen of the screen display device 47, comprising a touch panel, is operated to input various pieces of information, the inputting operation can be performed quickly and correctly.

Figure 6:
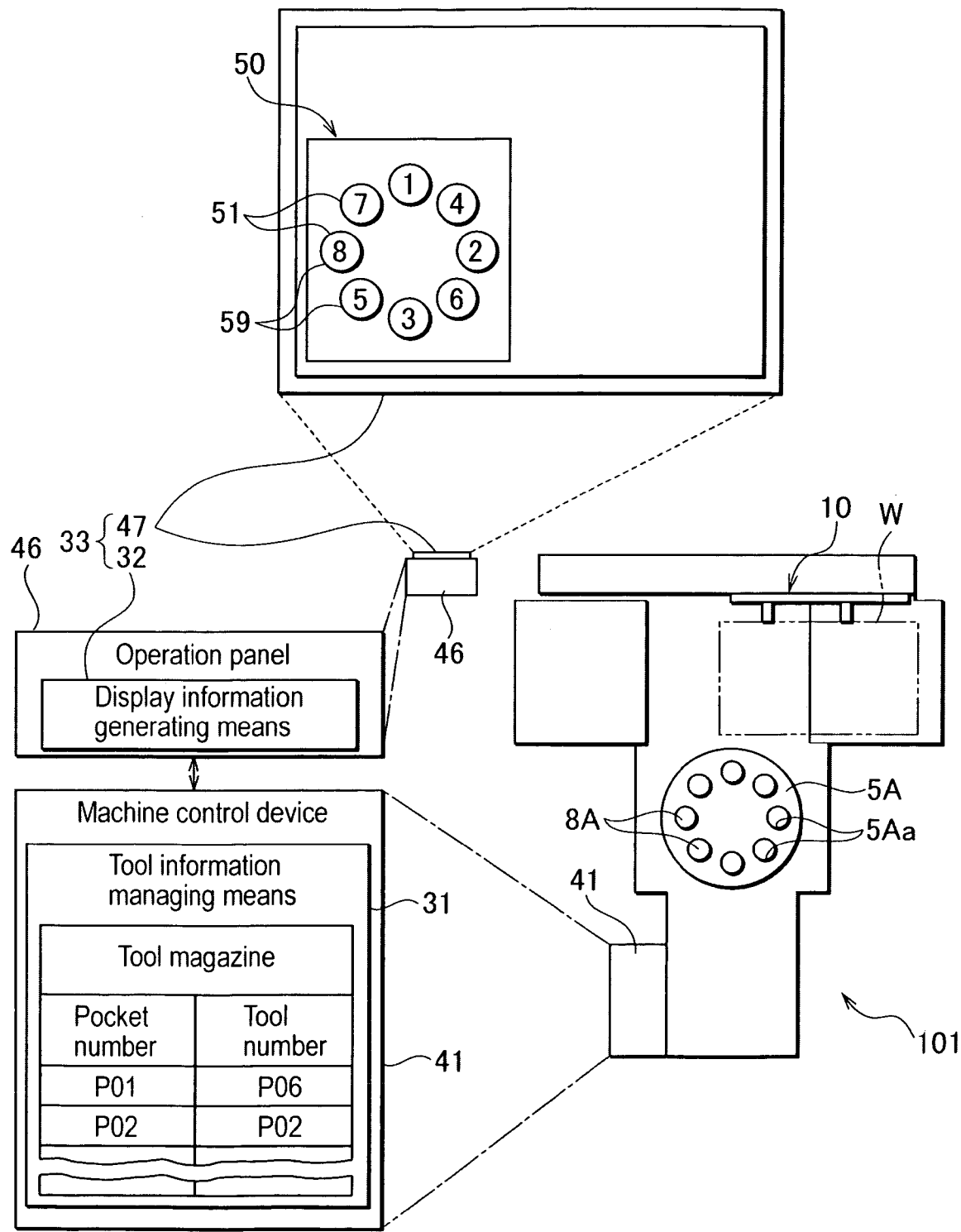
FIG. 6 is a block diagram showing the conceptual configuration of a tool information display device for a processing machine according to another embodiment of the present invention.

FIG. 6 shows another embodiment of the present invention. In this embodiment, the present invention is applied to the processing machine 101 that is a turret punch press. In this case, the turret in the processing machine 101 is a tool magazine 5A. Individual tools 8A are installed in pockets 5Aa on the tool magazine 5a, composed of the turret. Instead of the individual tools 8A, a multitool in which a plurality of individual tools are mounted may be installed in the pocket 5A.

The tool information managing means 31 of the machine control device manages the tools 8A installed in the respective pockets 5Aa on the tool magazine 5A, composed of the turret. The installation status display means 33 is composed of the screen display device 47 and display information generating means 32 as is the case with the above embodiment. As is the case with the above embodiment, the installation status display means 33 provides the pseudo installation status display 50 for the tools 8 on the screen of the screen display device 47, that is, displays the tool presence information 51 as an arrangement of circular marks corresponding to the arrangement of the pockets on the tool magazine 5A in a pseudo manner. In this example, the pseudo arrangement is circular. The tool presence information 51 contains the identification number display 59 for the tool 8.

Thus, even if the processing machine 101 is a turret punch press, the information on the tools 8 installed in the appropriate parts of the processing machine 101 can be displayed in an easy-to-understood manner. The identification numbers of the tools 8 can also be determined in an easy-to-understand manner. The other arrangements and effects of this embodiment are similar to those of the first embodiment.

In the description of the above embodiments, the processing machine 101 is a punch press. However, the present invention is also applicable to a machining center or the like and to common processing machines having tool magazines on which a plurality of tools are installed.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the invention.

The invention claimed is:

1. A tool information display device for a processing machine having tool magazines on each of which a plurality of tools can be installed, the device being characterized by comprising tool information managing means for managing information on the tools installed on said tool magazines and installation status display means for providing a display of installation status of the tools which reproduces installation and arrangement of the tools on the tool magazines in a pseudo manner, in accordance with the information managed by the tool information managing means.

2. A tool information display device for a processing machine according to claim 1, characterized in that the installation status display means displays, in the pseudo installation status display for the tools, tool presence information at positions on the tool magazines at which tools are installed and not at positions on the tool magazines at which no tools are installed.

3. A tool information display device for a processing machine according to claim 2, characterized in that the installation status display means displays the identification numbers of the tools in addition to the tool presence information.

4. A tool information display device for a processing machine according to claim 1, characterized in that the installation status display means displays, in the pseudo installation status display for the tools, tool presence information at positions on the tool magazines at which tools is installed, and displays the identification numbers of the tools in addition to the tool presence information.

* * * * *